July 26, 1960  G. W. LANG  2,946,110
DEVICE FOR TROWELLING COATINGS UPON MOVING TILES
Filed Feb. 1, 1957  2 Sheets-Sheet 2

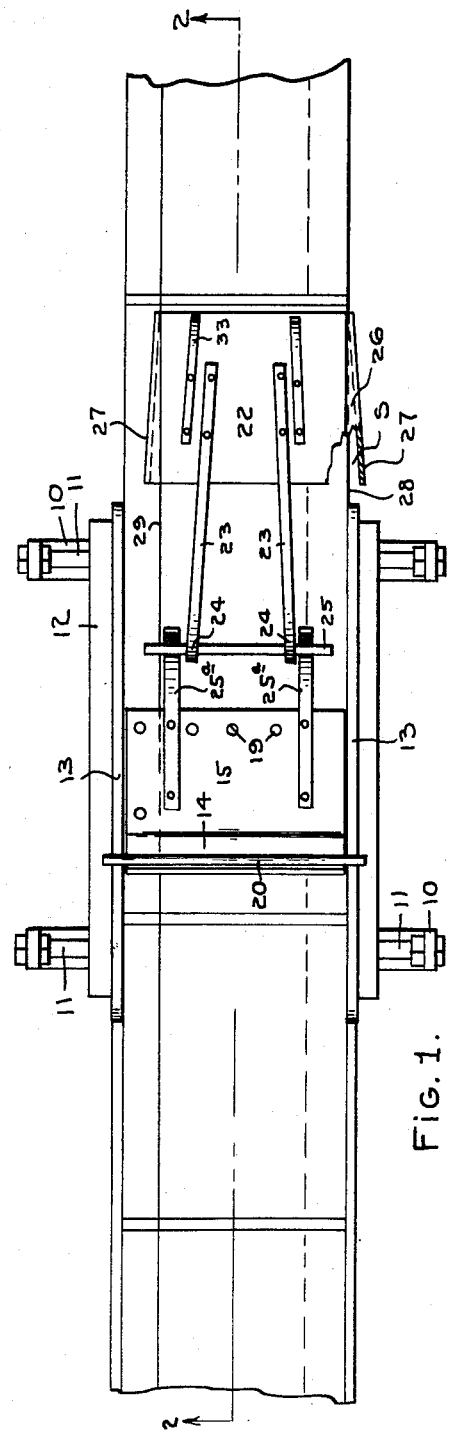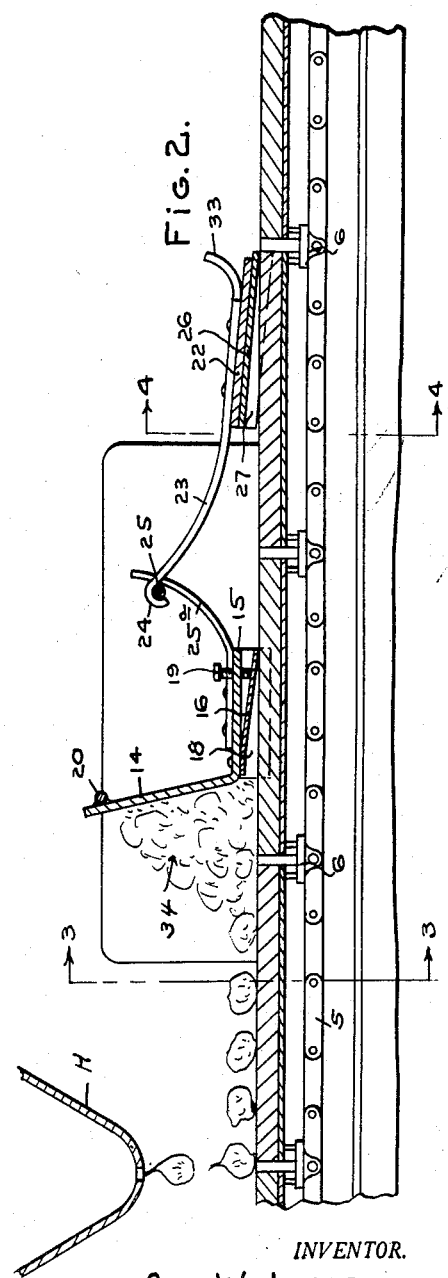

INVENTOR.
GUS W. LANG,
BY
Shepherd & Campbell
ATTORNEYS

United States Patent Office 2,946,110
Patented July 26, 1960

2,946,110

DEVICE FOR TROWELLING COATINGS UPON MOVING TILES

Gus W. Lang, 3323 Pembroke Road, Hollywood, Fla.

Filed Feb. 1, 1957, Ser. No. 637,666

6 Claims. (Cl. 25—1)

This invention relates to means for depositing and troweling a waterproofing and whitening composition upon cement roofing tiles during the manufacture of such tiles.

The body portions of cement roofing tiles are usually formed from a, so called, "mud" consisting of ordinary Portland cement and sand. Such tiles, if not coated with a whitening substance would present an unattractive, dirty grey, appearance.

It has been the practice to whiten and waterproof these tiles by sifting thereon (as they are carried along through the machine by which they are made) a whitening and waterproofing, powder like substance, such as white Portland cement or the like.

The present invention contemplates the provision of means by which a whitening and waterproofing composition may be supplied to the tiles in the form of a cream or paste and troweled, not only upon the flat faces of the tile but also upon such edge portions of the tiles as are exposed to view in the finished roof. The troweling mechanism is so constructed as to deliver a tile having its exposed portions of pristine whiteness and coated with a hard, dense coating, which renders the tile waterproof and is of such smoothness as to shed water and resist the accumulation of dirt upon the tile.

The invention further contemplates the utilization of the troweling device to mark the tiles as they pass said device in such manner as to indicate the center line thereof, whereby to aid the roofer in maintaining straight courses in the laying of roofs.

Figure 3:
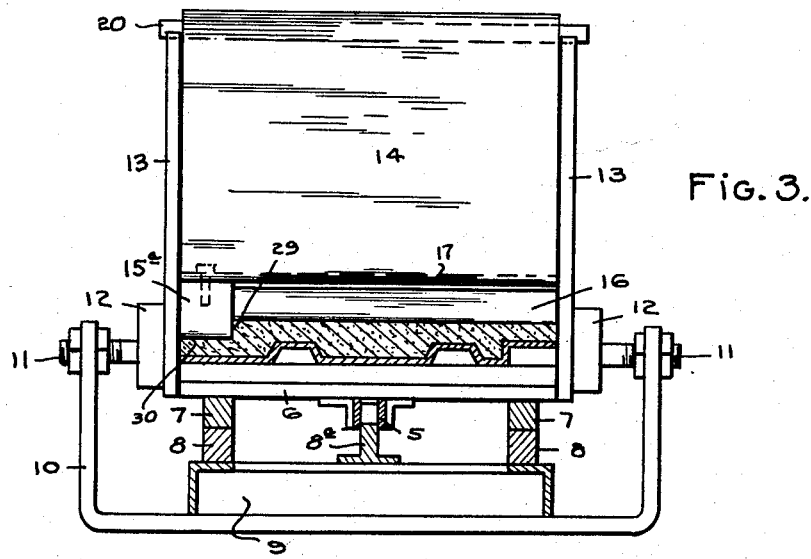
Figure 4:
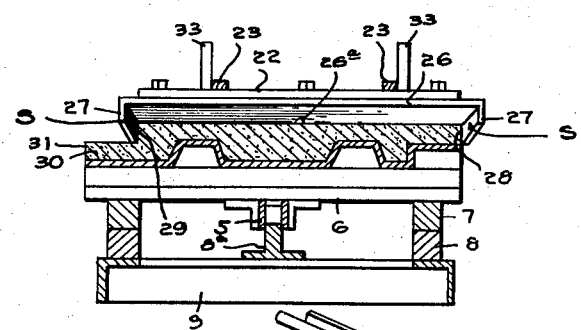
Figure 5:
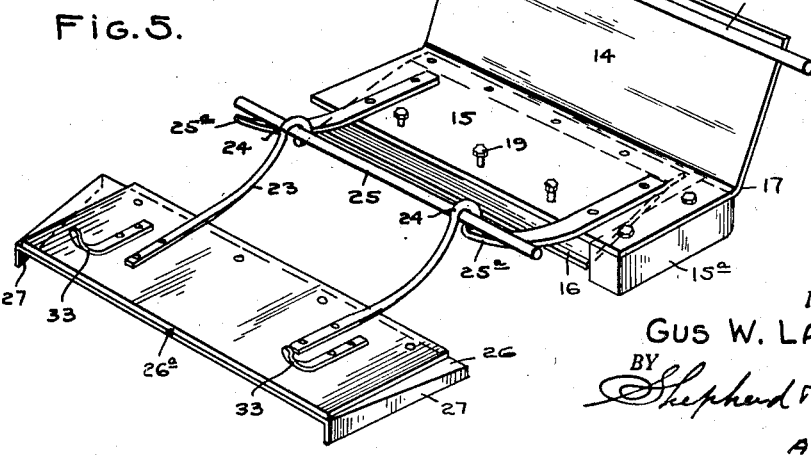

The invention will be best understood by reference to the accompanying drawing, wherein, Figure 1 is a fragmentary plan view,
Figure 2 is a longitudinal section on line 2—2 of Fig. 1,
Figure 3 is a transverse section on line 3—3 of Fig. 2,
Figure 4 is a transverse section on line 4—4 of Fig. 2,
Figure 5 is a perspective view of both the distributer head and the troweling elements.

The troweling device may be used in conjunction with any tile manufacturing machine, such for example as is shown in the patent to Domine Number 1,377,188 or in my own prior Patent 2,531,574. These patents show pallet supporting means mounted upon traveling conveyer chains by which the pallets are carried beneath forming rollers. My copending application Serial Number 378,050, which since the filing of this application has matured as Patent No. 2,847,749 also discloses a machine of this general type in which a sifting device discharges a finishing powder like composition of white cement upon the still wet tiles. Since, as hereinafter set forth, the finishing composition may be composed of white Portland cement and water and since such hydraulic coating composition is deposited, as a paste, upon the still wet tiles during their initial formation, it follows that these two water bearing materials will bond into a homogeneous structure, to yield the hard, dense, water shedding surface described.

In the drawing 5 designates a traveling conveyer chain, which carries pallet supports 6. Shoes 7 upon the pallet supports slide upon rails 8, which rails are supported upon transverse members 9 of the machine frame. A guide rail 8a which engages the conveyer chain prevents lateral movement of said chain and pallet carriers. U-shaped members 10 are supported from members 9 or any convenient part of the machine frame. Adjusting bolts 11 which pass through the upstanding legs of said U-shaped members support short rails 12; the latter, in turn carrying fixed upstanding plates 13, one at each side of the machine, and between which plates the pallets and the formed tiles are carried. These plates constitute the side walls of a paste collecting receptacle, the bottom of which receptacle is constituted by the upper faces of the tiles which are to be coated and the front wall of which is formed by the upstanding back 14 of an L-shaped angle iron. This angle iron comprises the back wall 14 and a lower web 15. The web 15 lies far enough above the upper faces of the formed tiles to permit the location of a relatively thin plate 16 beneath said web. This plate 16 is of such dimensions as to extend entirely across the exposed faces of the tiles and from the heel 17 of the angle iron to a point beneath the front edge of web 15. The plate is attached to the angle iron beneath its heel and the forward edge of the plate contacts the exposed upper faces of the tiles. This plate is disposed at such an angle as to form a forwardly converging space 18 between itself and the upper faces of the tiles. A row of adjusting screws 19 serves to adjust the tension of the forward edge of the plate upon the tiles, said screws being carried by the forward edge of the web 15. A bar 20 secured to the upstanding back web 14 has its ends projecting over and trunnioned upon the upper edges of the fixed plates 13. Thus the whole distributer head comprising the angle iron, plate 16, adjusting screws 19 and the horns hereinafter described are mounted to rock vertically upon the trunnions so that the forward edge of plate 16 will rest yieldingly upon the tiles, and upon the paste like material to be deposited thereon. This distributer head deposits the said material upon the tiles and rough trowels the same, the fine and finishing troweling being effected by a troweling structure which is supported from the distributer head and is floatingly mounted with respect thereto, in the sense that it will have yielding movement with respect to said head both vertically and laterally of the tiles to be finished. The vertical rocking permitted the distributer head insures such yielding contact of the forward edge of plate 16 upon the tile that inequalities of the tile will not result in a raked spot upon the tile.

The troweling device includes a plate 22 having a pair of rearwardly and upwardly directed arms 23 secured thereto. These arms terminate in hook like ends 24 which hook over and loosely engage a transverse bar 25. Bar 25 is welded or otherwise affixed, to horns 25a which curve upwardly from and are affixed to the upper face of web 15. The troweling element which effects the finished troweling consists of a, preferably sheet metal, plate 26 which is wider at its rear side than at its front side and which has downturned and divergent outer end portions 27. Plate 26 is secured to, underlies, and is carried by plate 22. Thus when the troweling element 26 has become worn it may be removed and a new element substituted therefor without having to replace the arms 23 and associated parts. By making the troweling element (plate 26 and downturned ends 27) wider at its rear portion than at its front edge, forwardly convergent spaces S are provided between said downturned portions and the adjacent edges of the tiles, so that the whitening paste, at the sides of the tiles, is caught and carried toward the edges of the tiles and troweled firmly and smoothly thereon.

It should be explained that it is not both of the extreme outer edges of the tiles which are coated by element 26—27. The tiles which are most widely used are of the interlocking type which at one side presents an exposed edge 28 that is to be coated and at its opposite side presents a vertical wall 29 which has to be coated but which lies inwardly of a terminal flange 30, having an edge 31, which does not have to be coated because it is not visible in the laid roof. Therefore it will be understood that the portions of the tiles upon which the paste is troweled are the flat upper faces of the tiles, the vertical elevated edge 28 and the vertical wall 29, and it is these portions which travel beneath plate 26 and between the downturned ends 27. A block 15a is secured to the under side of web 15 and the vertical wall 29 of the moving tile abuts the inner side of said block and the flange 30 of the tile travels beneath the block. Plate 26 may have a slight notch 26a formed in its contacting edge in a position to leave a slight rib or mark upon the finished tile to indicate the center line of the working face. This aids the roofer in maintaining straight lines in the laying of the tiles upon a roof.

Plate 22 may carry upwardly curved, spaced fingers; 33 which are welded or otherwise rigidly affixed to said plate. These fingers serve to receive and retain elongated bar weights (not shown) by which the tension of plate 26, upon the tiles, may be varied, if desired.

The operation of the device is as follows. From a hopper H, disposed in advance of the distributor head the coating material is discharged upon the upper faces of the traveling tiles in the form of large globules of a paste like consistency of such stiffness that they will, for a short time stand up in globule like form. This coating material collects in the receptacle formed by wall 14 of the angle iron and between plates 13. There it banks up in a mass 34. From the underside of this mass the material is carried by the moving tiles into the forwardly converging space 18 beneath plate 16 and is rough troweled upon the upper faces of the tile. The moving tiles then pass beneath troweling plate 26 where a fine finish troweling is effected both on the tile faces, and by the downturned edges 26 upon the edges 28 and vertical walls 29 of the tiles. Any surplus coating material left along the tiles by plate 16 is caught, and collected into the converging space S, as previously described.

The coating composition to be employed may be varied at will as long as it is of the consistency described, is of the proper color and yields a hard, dense, smooth and highly waterproof surface on the tiles. While a pure white surface is usually desired, coloring materials may be added. Pure white Portland cement and water may be used or white plaster, lime or any waterproofing material which will not impair the whiteness, may be added to the white Portland cement.

Further the utility of the troweling device is not limited to tiles of the particular cross sectional shape described. For example, the device may trowel the coating upon tiles of uniform cross section, coating the flat upper face and the two outer edges of such tile.

Therefore it is to be understood that the invention includes within its purview whatever changes fairly fall within either the terms or the spirit of the appended claims.

I claim:

1. In combination with a machine for forming cement roofing tiles of the character in which a traveling conveyer conducts tiles newly formed of Portland cement, along a path, a paste receiving means disposed in said path through which the tiles travel, a two step troweling mechanism mounted to straddle said path and the line of travel of said tiles, said troweling mechanism comprising a first and coarse troweling device disposed within the paste receiving means, means for feeding a relatively stiff coating paste to said paste receiving means and to the first troweling device, means embodied in the first and coarse troweling device for troweling said paste upon the tiles as said tiles move past the coarse troweling device, a second and fine troweling device, likewise straddling the line of travel of the tiles and means for floatingly supporting the fine troweling device for movement in a vertical plane, said fine troweling device comprising means for collecting surplus paste which leaves the coarse troweling mechanism and pressing said surplus paste toward vertical portions of the traveling tiles.

2. A structure as recited in claim 1 wherein the said fine troweling device comprises an inclined plate, the front edge of which, that is disposed toward the oncoming tile, lying slightly higher than its opposite edge, downwardly extending wings carried by said inclined plate at its opposite ends, which wings flare toward the oncoming tile, said wings extending below the level of the tops of the tiles to a degree that surplus paste coating material from the tops of the tiles is caught by the flaring wings and pressed toward the tiles.

3. In combination with a machine for forming cement roofing tiles of the character in which a traveling conveyer conducts tiles newly formed of Portland cement along a path, a troweling device which straddles said path and overlies the traveling tiles, said troweling device comprising a pair of vertically disposed fixed plates between which the tiles travel, a transverse head mounted upon such plates for vertical rocking movement between the plates, said head comprising an upstanding transverse wall which, with the plates, constitutes a receptacle for a mass of putty-like material to be troweled upon the tiles, a container for a supply of the material of putty-like consistency, said container being located in advance of the transverse wall and discharging said material directly upon the upper face of the traveling tiles, a coarse troweling means carried by and projecting from the lower edge of the upstanding wall beneath which the putty-like coating material is drawn by the moving tiles and a finishing trowel structure pivotally supported from said head and floatingly riding upon the faces of the tiles.

4. A trowelling device of the character described comprising a pair of vertical plates spaced apart a distance to permit a line of traveling tiles to pass between them, said vertical plates forming the side walls of a paste collecting and retaining receptacle, a closure for the front side of said receptacle comprising an L-shaped member, means for suspending said member for vertical rocking movement between said plates, means for feeding a paste-like material into the space between said walls and behind the L-shaped member, a trowelling plate secured to the underside of the L-shaped member at the rear portion thereof, the front edge of said trowelling plate being free and said plate being downwardly inclined toward its free edge, a tensioning bearing means between the trowelling plate and the L-shaped member, a transverse bar supported from and lying above the level of the L-shaped member, a second trowelling element hung upon said bar, said second trowelling element comprising a flat plate having downturned and rearwardly divergent outer end portions, a pair of spaced arms from which said flat plate is supported, said arms extending toward and being engaged at their rear ends over the transverse bar, whereby the second trowelling member is floatingly mounted for vertical movement with respect to said bar, said flat plate being elevated at its rear edge and inclining downwardly from said rear edge to the front edge thereof.

5. A trowelling device for use upon machines for forming cement roofing tile of the character in which a traveling conveyor conducts newly formed and still wet tiles of Portland cement along a path; said trowelling device straddling the said path and comprising a first troweling structure comprising a receptacle consisting of spaced side walls and a front wall, the rear side of the said receptacle and the bottom thereof being open, the traveling tiles passing through and forming a bottom of the receptacle at the time of their passage therethrough, a substantially horizontal trowelling plate supported from the front wall and having an edge that is disposed toward the oncoming tile slightly elevated above the tile and having its opposite edge disposed in contacting and trowelling relation to the top faces of the tiles, means for feeding a coating material in the form of a paste between the side walls and behind the said front wall of the receptacle, said paste being of such consistency as to mound up behind the front wall and to be drawn into the forwardly converging space beneath the trowelling plate that is created by the elevation of that edge of the plate that is disposed toward the oncoming tiles, a second and fine trowelling structure likewise straddling the moving tiles, and means for pivotally supporting the fine trowelling structure from the first trowelling structure for floating movement in a vertical plane, said means comprising forwardly projecting horns upon the first trowelling structure, a transverse bar affixed to said horns and a pair of arms projecting rearwardly from the fine trowelling structure, the ends of which arms engage said bar.

6. A trowelling device for use upon machines for forming cement roofing tile of the character in which a traveling conveyor conducts newly formed and still wet tiles of Portland cement along a path; said trowelling device straddling the said path and comprising a first trowelling structure comprising a receptacle consisting of spaced side walls and a front wall, the rear side of the said receptacle and the bottom thereof being open, the traveling tiles passing through and forming a bottom of the receptacle at the time of their passage therethrough, a substantially horizontal trowelling plate supported from the front wall and having an edge that is disposed toward the oncoming tile slightly elevated above the tile and having its opposite edge disposed in contacting and trowelling relation to the top faces of the tiles, means for feeding a coating material in the form of a paste between the side walls and behind the said front wall of the receptacle, said paste being of such consistency as to mound up behind the front wall and to be drawn into the forwardly converging space beneath the trowelling plate that is created by the elevation of that edge of the plate that is disposed toward the oncoming tiles, a second and fine trowelling structure disposed in the line of travel of the tile at a point beyond the first trowelling structure, said fine trowelling structure comprising arms projecting in the direction of travel of the tiles which arms have pivotal engagement upon the first trowelling structure and are capable of vertical movement with respect to the tiles, a fine troweling plate supported from said arms, said plate having an elevated edge disposed toward the oncoming tile and an edge opposite to said elevated edge which rests upon and fine trowels said tiles, said plate being wider at its elevated edge than at its trowelling edge and said plate carrying downturned ends which diverge toward the oncoming tiles and which ends extend downwardly far enough to catch and press any surplus coating material which may extend over the side portions of the tiles, against said side portions.

References Cited in the file of this patent

UNITED STATES PATENTS

| | | |
|---|---|---|
| 941,792 | Meeker | Nov. 30, 1909 |
| 1,377,188 | Domine | May 10, 1921 |
| 1,559,499 | Brandell | Oct. 27, 1925 |
| 1,833,582 | Kavanagh | Nov. 24, 1931 |
| 1,999,367 | McCorkle | Apr. 30, 1935 |
| 2,015,084 | McQuade | Sept. 24, 1935 |
| 2,301,498 | Ames | Nov. 10, 1942 |
| 2,339,235 | Allen | Jan. 18, 1944 |
| 2,531,574 | Lang | Nov. 28, 1950 |
| 2,553,481 | Sharples | May 15, 1951 |
| 2,588,595 | Warner | Mar. 11, 1952 |
| 2,734,249 | Willis | Feb. 14, 1956 |
| 2,752,656 | Rutgers | July 3, 1956 |

FOREIGN PATENTS

| | | |
|---|---|---|
| 22,365 | Denmark | Aug. 7, 1917 |
| 148,389 | Sweden | Jan. 4, 1955 |